No. 720,932. PATENTED FEB. 17, 1903.
J. KENNEDY.
ADJUSTING SCREW MECHANISM FOR ROLLING MILLS.
APPLICATION FILED MAY 3, 1902.
NO MODEL. 2 SHEETS—SHEET 1.
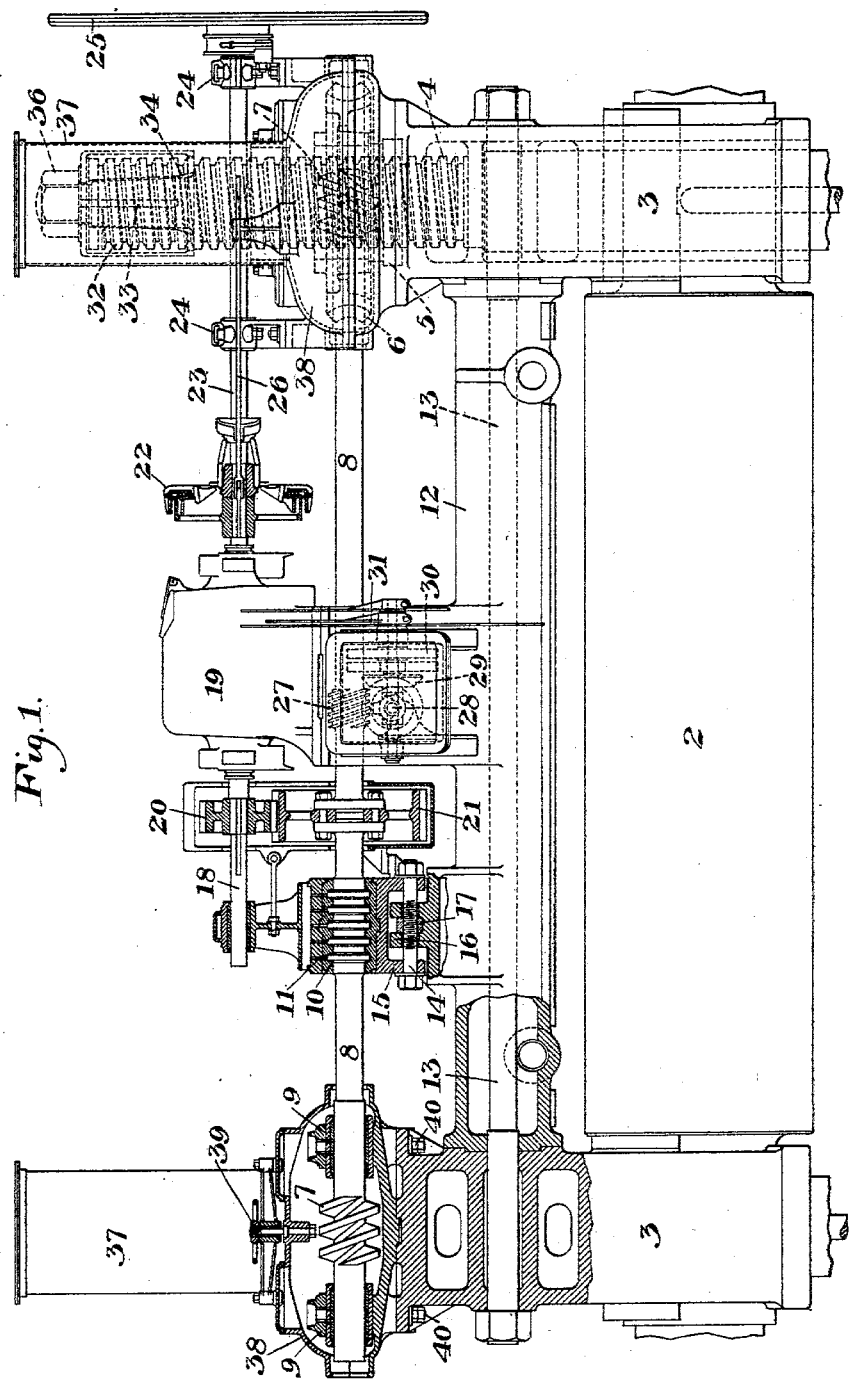
WITNESSES
INVENTOR No. 720,932. PATENTED FEB. 17, 1903.
J. KENNEDY.
ADJUSTING SCREW MECHANISM FOR ROLLING MILLS.
APPLICATION FILED MAY 3, 1902.
NO MODEL. 2 SHEETS—SHEET 2.
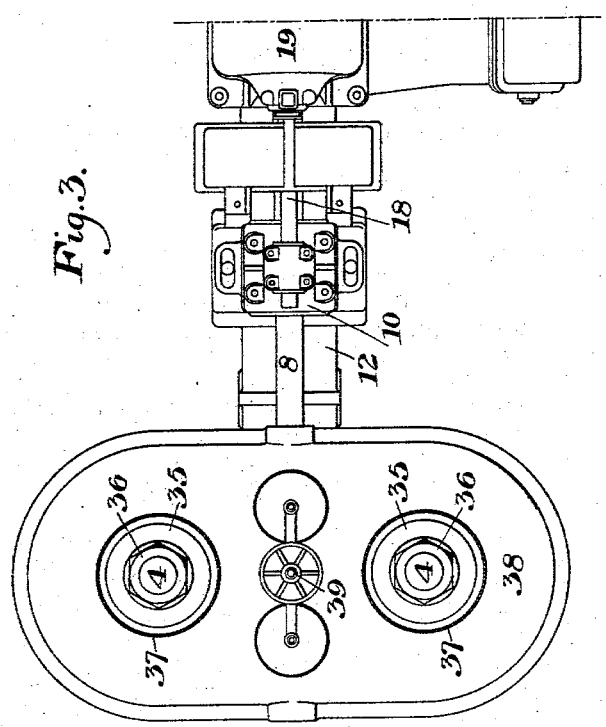
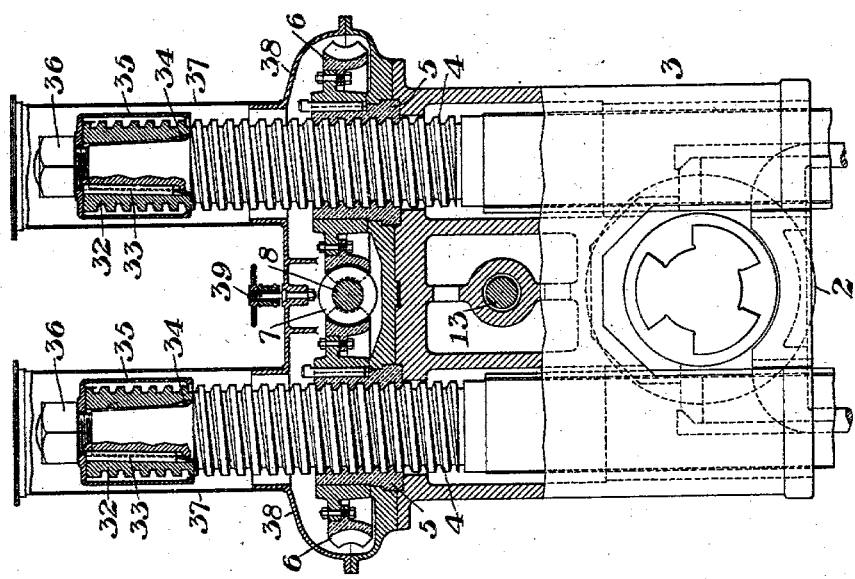
WITNESSES
INVENTOR

UNITED STATES PATENT OFFICE.

JULIAN KENNEDY, OF PITTSBURG, PENNSYLVANIA.

ADJUSTING-SCREW MECHANISM FOR ROLLING-MILLS.

SPECIFICATION forming part of Letters Patent No. 720,932, dated February 17, 1903.

Application filed May 3, 1902. Serial No. 105,715. (No model.)

*To all whom it may concern:*

Be it known that I, JULIAN KENNEDY, of Pittsburg, in the county of Allegheny and State of Pennsylvania, have invented a new and useful Adjusting-Screw Mechanism for Rolling-Mills, of which the following is a full, clear, and exact description, reference being had to the accompanying drawings, forming part of this specification, in which—

Figure 1 is a front elevation, partly broken away, showing the upper part of a rolling-mill provided with my improved adjusting-screw mechanism. Fig. 2 is a sectional end view of the same, and Fig. 3 is a top plan view of the left-hand portion of Fig. 1.

My invention relates to the adjusting-screws for rolling-mills, and is designed to provide an improved system for operating the screws and also to improve the construction of the screws to provide for easy removal and replacing of the parts. It relates especially to the mill of my Patent No. 693,031, dated February 11, 1902.

In the drawings, 2 represents the upper roll of a mill, and 3 3 the end housings. Two screws 4 4 extend vertically through each housing, their screw-threads engaging screw-thread bushings 5 5, seated in the upper part of the housing in suitable cylindrical bearings. A worm-wheel 6 is keyed to the upper portion of each bushing, and all four worm-wheels engage worms 7 upon a longitudinal central shaft 8. This shaft is carried in suitable end bearings 9, and at an intermediate point is provided with a thrust-bearing 10. This thrust-bearing may be formed in the usual manner by providing interfitting rings and grooves upon the shaft and bearing, and the bearing is preferably provided in its top portion with oil-holes 11. This bearing is carried upon a horizontal frame member 12, extending over the top roll and preferably secured in place by a through-bolt 13. To provide for endwise adjustment of the shaft 8, I provide a screw-bolt 14, which extends through the legs 15 of the bearing and through holes in the lugs 16 on the frame 12, between which lugs is a removable nut 17. By adjusting the screw-bolt 14 the shaft may be shifted endwise to vary the relative position of the screws at either end.

The thrust-bearing for the shaft 8 is extended upwardly to form a bearing for a counter-shaft 18, which is connected at its end to an electric motor 19. To the shaft 18 is splined a pinion 20, which intermeshes with a toothed wheel 21, secured to the shaft 8, and having wider teeth than the pinion. The shaft of the electric motor 19 has a clutch connection 22 with a shaft 23, carried in bearings 24, and having an end hand-wheel 25. The clutch is actuated by the hand-lever 26. By this arrangement the screws may be actuated either through the electric motor, for which a suitable controller is provided, or the clutch may be thrown in and the screws then adjusted by means of the hand-wheel.

To operate the pointers or indicators for the adjusting-screws, I provide on the shaft 8 a worm 27, intermeshing with the worm-wheel on a short shaft 28, having bevel-gear connection 29 with slow-motion mechanism 30, which actuates the pointers 31.

To provide for easy removal of the top work for changing rolls and to prevent stripping of the screws, I preferably provide the adjusting-screws with an upper removable section 32. This section is screw-threaded on its outer surface to correspond with the screw and is preferably provided with a cylindrical bore which tapers inwardly and upwardly. It may be secured to the screw-stub by key 33, a bushing 34 being preferably provided within its lower end. Around the section 32 is a casing 35, which extends over a stop. The securing-nut 36 bears upon this casing and holds the parts in place.

To prevent scale and dust from contacting with the screws and their adjusting worm-wheels, I preferably provide cylindrical casings 37, which fit down over the top of the adjusting-screws and rest upon the top of the casing 38, which incloses the worm-wheels and worms. Top plates on the casing 38 are removable to give access to the bearings and are held by screw-and-yoke mechanism 39. In order to remove the top work, it is only necessary to adjust the screws until the bushings engage their removable sections. The securing-bolts 40 are then removed, and the top work being loosened the whole may be removed by a crane, the top screw-sections sliding up over their central stubs.

The advantages of my invention result from the improved arrangement for operating the screws and, further, from the use of the removable screw-sections, which facilitates the removal and replacing of the parts.

Many changes may be made in the form and arrangement of the mill and its parts without departing from my invention.

I claim—

1. A rolling-mill having coacting horizontal rolls between which the metal is reduced, adjusting-screws for the bearings of the upper roll, worm-gear connections between the screws, and a shaft extending longitudinally of the rolls above the upper roll and a thrust-bearing for said shaft; substantially as described.

2. A rolling-mill having coacting horizontal rolls, adjusting-screws for the bearings of the upper roll, a horizontal shaft having worm-gear connection with said screws, an intermediate thrust-bearing for the shaft, and means for adjusting said bearing longitudinally; substantially as described.

3. A rolling-mill having adjusting-screws, a horizontal shaft arranged to operate them, a motor mounted on the roll-housing and arranged to actuate the shaft, and a hand-wheel also arranged to actuate the shaft, one of said actuating mechanisms having a detachable clutch connection; substantially as described.

4. In a rolling-mill a screw having a removable externally-threaded end section of the same external diameter as the screw and constituting an extension thereof; substantially as described.

5. A rolling-mill having an adjusting-screw provided at its end with an annular removable externally-screw-threaded section of the same external diameter as the screw, and secured thereto, and a nut arranged to engage the screw and said section; substantially as described.

6. In a rolling-mill, a screw, and a nut engaging the screw, said screw having a removable externally-screw-threaded portion constituting an extension thereof, said portion being arranged to be removed with the nut; substantially as described.

7. A rolling-mill having a screw, a removable screw-threaded section forming part of the screw, and connections arranged to cause the screw-threads of the body and the removable section to register; substantially as described.

8. A rolling-mill having four adjusting-screws for the rolls and removable externally-screw-threaded extensions on said screws arranged to be removed simultaneously with the upper parts of the housings; substantially as described.

In testimony whereof I have hereunto set my hand.

JULIAN KENNEDY.

Witnesses:
GEO. B. BLEMING,
H. M. CORWIN.